No. 847,225. PATENTED MAR. 12, 1907.
H. R. BARNARD.
COOKING UTENSIL.
APPLICATION FILED SEPT. 13, 1905.
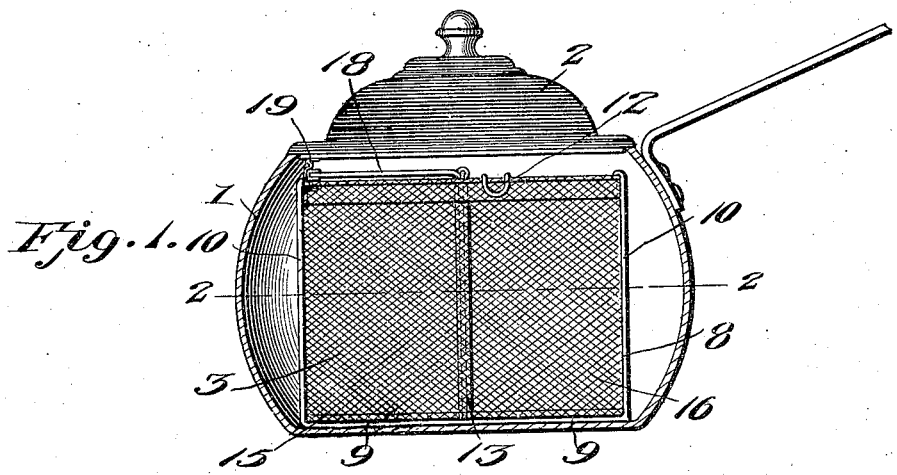
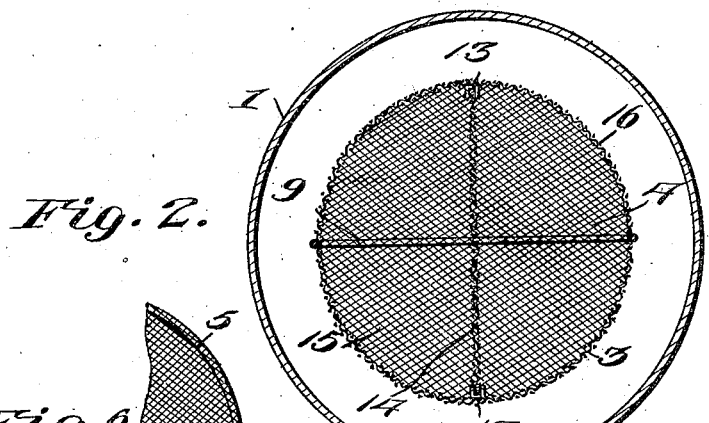
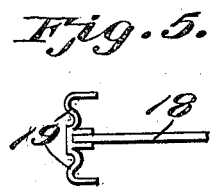
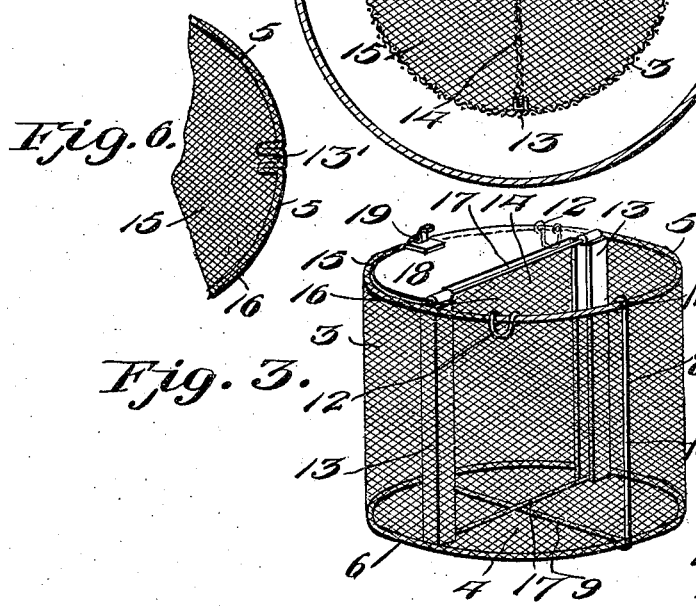
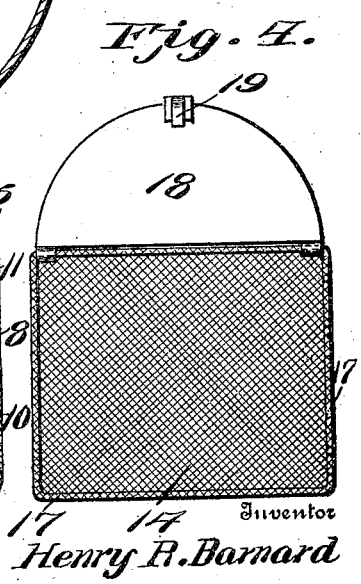
Inventor
Henry R. Barnard
Witnesses
Frank B. Hoffman
C. C. Hines
By Victor J. Evans.
Attorney

UNITED STATES PATENT OFFICE.

HENRY R. BARNARD, OF EAST ORANGE, NEW JERSEY.

COOKING UTENSIL.

No. 847,225.  Specification of Letters Patent.  Patented March 12, 1907.

Application filed September 13, 1905. Serial No. 278,308.

*To all whom it may concern:*

Be it known that I, HENRY R. BARNARD, a subject of the King of Great Britain, residing at East Orange, in the county of Essex and State of New Jersey, have invented new and useful Improvements in Cooking Utensils, of which the following is a specification.

This invention relates to improvements in cooking utensils, and particularly to an open-work cage or basket adapted to be used in sauce pans and the other similar vessels of the boiler type for cooking various kinds of fruits, meats, vegetables, and other edibles.

The object of the invention is to provide a utensil of this character having a partition for dividing the same into any desired number of compartments wherein different kinds of edibles may be simultaneously cooked and kept separate from each other, said partition being adapted for ready removal, so that the entire area of the vessel may be used for cooking any one kind of edible or made dish, if desired; also, to provide a lid or cover for closing one of the compartments while the contents of the other are being discharged and to so construct the basket as to render it strong and durable while permitting of the free drainage of the water therefrom when the basket is lifted out of the cooking vessel, thus obviating the necessity of using a colander; also, to provide a basket in which the frame acts as a support to hold the bottom of the basket above the bottom of the cooking vessel to prevent possible burning of the contents of the basket.

With these and other objects in view the invention consists of the features of construction, combination, and arrangement of parts hereinafter described and claimed, reference being had to the accompanying drawings, in which—

Figure 1 is a vertical section of a saucepan or like cooking vessel, showing the basket disposed therein for use. Fig. 2 is a horizontal section thereof taken on the line 2 2 of Fig. 1. Fig. 3 is a perspective view of the basket removed from the vessel. Fig. 4 is a view of the partition and lid. Fig. 5 is an edge view of a portion of the lid, showing the catch carried thereby, and Fig. 6 is a fragmentary view of the basket, showing a modified form of guideway.

Referring now more particularly to the drawings, the numeral 1 designates a saucepan or other similar cooking-vessel of the boiler type, and 2 its cover.

The cage or basket comprises a body 3 and bottom 4, composed of wire, perforated sheet metal, or any other suitably foraminous or reticulated material, but preferably of woven wire of a desired mesh, and made of any form and dimensions to suit the taste or fancy and character of cooking vessel in connection with which it is designed to be used. In the present instance I have shown the body and bottom of the basket as composed of woven wire and supported and reinforced by a frame comprising top and bottom rims or rings 5 and 6 of stiff wire, the bottom rim being reinforced by cross-braces 7 extending at right angles to each other over the upper surface of the bottom 4. A U-shaped brace 8 also embraces the basket, its cross-piece 9 extending beneath the bottom 4, while its side arms 10 project upwardly on the outside of the body at diametrically opposite sides thereof and are hooked at their free ends, as indicated at 11, to engage the rim 5. The wire comprising the body and bottom may be fastened to the frame in any preferred manner, and the elements of the frame may be soldered or otherwise connected. I do not limit myself to this particular manner of constructing the basket, as the character of construction may vary. The basket is provided at opposite sides with handles 12, whereby it may be conveniently lowered into and lifted out of the vessel. These handles are preferably pivoted to the rim 5 not to interfere with the insertion and removal of the basket or with the movement of the basket lid. While in use, the basket is partially or wholly submerged in the water contained in the vessel 1, and the cross-piece 9 of the brace 8 acts as a support to hold the bottom of the basket above the bottom of the vessel to obviate all liability of the contents of the basket being burned. As the water and steam can circulate freely through the basket, the food will be as quickly and thoroughly cooked as though contained directly by the vessel, and upon the removal of the basket all the water will drain therefrom back into the vessel.

The basket is provided at its sides with vertical guides 13, suitably fixed thereto to slidably receive the side edges of a removable partition 14. This partition 14 when inserted separates the interior of the basket into separate compartments 15 and 16 and terminates slightly below the rim 5. The body of the partition is made of sheet metal or wire mesh, the latter, if used, as shown, being secured at its edges to a stiff rectangular wire frame 17, to the upper cross-piece of which is pivoted a lid or cover 18, adapted to be swung over either compartment to close the same. This lid is made of sheet metal or other imperforate material and is provided with a duplex catch 19, the members of which project from opposite sides thereof to engage the rim 5 and lock the lid closed in either of its positions. This lid permits either compartment to be closed to retain the contents thereof when the basket is inverted to discharge the contents of the other compartments, thus preventing mingling of the substances. When the lid is locked, the partition is drawn toward and caused to bind against the sides of the guides adjacent the closed apartment, whereby displacement of the lid is prevented. Of course the guides, lids, and catch may be constructed in any other preferred manner, and the partition may be formed to separate the basket into any desired number of compartments. Instead of forming the guideways of metallic strips secured to the netting of the basket, the guideways may be formed, as shown in Fig. 6, by bending the wire-netting, as indicated at 13'.

The construction and mode of use of the device will be readily understood from the foregoing description and its manifold advantages appreciated by those versed in the culinary art.

Having thus described the invention, what I claim as new is—

1. A cooking utensil of the character described comprising a perforate vessel provided with interior guideways, a partition slidably mounted in said guideways, and a lid hinged to the partition and movable in reverse directions to close the compartments formed thereby, said lid being provided with a compound catch composed of reversely-extending members for attaching it to the vessel in either of its positions.

2. A cooking utensil of the character described, comprising a vessel having interior guideways, a partition slidably mounted in said guideways, a lid hinged to the partition to close either of the compartments formed thereby, and a catch carried by said lid and comprising oppositely-projecting hooks to engage the rim of the vessel at diametrically opposite sides thereof to hold the lid in either of its closing positions.

In testimony whereof I affix my signature in presence of two witnesses.

HENRY R. BARNARD.

Witnesses:
W. H. CRICHTON CLARKE,
H. G. HOSE.